United States Patent
Whitt et al.

(10) Patent No.: US 8,527,815 B2
(45) Date of Patent: Sep. 3, 2013

(54) METHOD FOR DETECTING A FAILURE IN A SAS/SATA TOPOLOGY

(75) Inventors: Jeffrey K. Whitt, Colorado Springs, CO (US); Sreedeepti Reddy, Colorado Springs, CO (US); Edoardo Daelli, Castle Rock, CO (US); Brandon L. Hunt, Colorado Springs, CO (US)

(73) Assignee: LSI Corporation, San Jose, CA (US)

( * ) Notice: Subject to any disclaimer, the term of this patent is extended or adjusted under 35 U.S.C. 154(b) by 386 days.

(21) Appl. No.: 12/883,720

(22) Filed: Sep. 16, 2010

(65) Prior Publication Data
US 2012/0072772 A1    Mar. 22, 2012

(51) Int. Cl.
*G06F 11/00* (2006.01)
(52) U.S. Cl.
USPC ............ 714/43; 714/25; 714/33; 714/56
(58) Field of Classification Search
USPC ............ 714/25, 27, 33, 37, 40, 42, 43, 48, 714/56
See application file for complete search history.

(56) References Cited

U.S. PATENT DOCUMENTS

| | | | |
|---|---|---|---|
| 6,865,689 B1 * | 3/2005 | Gibson et al. | 714/4.2 |
| 7,660,893 B2 * | 2/2010 | Brillhart et al. | 714/48 |
| 7,804,784 B1 * | 9/2010 | Lo | 370/251 |
| 2006/0048200 A1 | 3/2006 | Jaworski et al. | |
| 2007/0070885 A1 * | 3/2007 | Uddenberg et al. | 370/225 |
| 2008/0192814 A1 * | 8/2008 | Hafed et al. | 375/224 |
| 2010/0095166 A1 | 4/2010 | Krepner et al. | |
| 2011/0246833 A1 * | 10/2011 | Bockhaus et al. | 714/37 |

* cited by examiner

*Primary Examiner* — Joseph D Manoskey
(74) *Attorney, Agent, or Firm* — Suiter Swantz pc llo

(57) ABSTRACT

A method for detecting a failure in a serial topology. The method may comprise sending a predetermined pattern to a plurality of devices communicatively connected to an initiator in a serial topology; receiving a return result from each of the plurality of devices in response to the predetermined pattern; recognizing a problem associated with a particular device among the plurality of devices, the problem being recognized based on the return result from the particular device; sending a plurality of test patterns to the particular device; receiving a plurality of test results from the particular device in response to the plurality of test patterns; and determining a cause of the problem based on the plurality of test results, the cause of the problem being at least one of: a cable failure and a device failure.

20 Claims, 2 Drawing Sheets

US 8,527,815 B2

METHOD FOR DETECTING A FAILURE IN A SAS/SATA TOPOLOGY

TECHNICAL FIELD

The present invention relates to the field of error detection and particularly to a system and method for detecting a failure in a SAS/SATA topology.

BACKGROUND

Various protocols may be defined to facilitate data transferring between computers and peripheral devices. For example, the Serial Attached Small Computer System Interface (SAS) protocol provides an interface that implements a point-to-point serial protocol. The layout of the devices connected in accordance with the SAS protocol may be referred to as a SAS topology. Serial Advanced Technology Attachment (SATA) is another exemplary point-to-point serial protocol. The layout of the devices connected in accordance with the SATA protocol may be referred to as a SATA topology. Furthermore, the layout of devices connected in accordance with any protocol that implements a point-to-point serial protocol may be generally referred to as a serial topology.

SUMMARY

Accordingly, an embodiment of the present disclosure is directed to a method for error detection. The method may comprise sending a predetermined pattern to a plurality of devices communicatively connected to an initiator in a serial topology; receiving a return result from each of the plurality of devices in response to the predetermined pattern; recognizing a problem associated with a particular device among the plurality of devices, the problem being recognized based on the return result from the particular device; sending a plurality of test patterns to the particular device; receiving a plurality of test results from the particular device in response to the plurality of test patterns; and determining a cause of the problem based on the plurality of test results, the cause of the problem being at least one of: a cable failure and a device failure.

A further embodiment of the present disclosure is directed to a method for error detection. The method may comprise sending a plurality of test patterns to a device, the device communicatively connected to an initiator in a serial topology; receiving a plurality of test results from the device in response to the plurality of test patterns; determining whether more than one of the plurality of test results have physical layer errors; reporting a cable failure when more than one of the plurality of test results have physical layer errors; and reporting a device failure when not more than one of the plurality of test results have physical layer errors.

An additional embodiment of the present disclosure is directed to a storage system. The storage system may comprise an initiator and at least one target device communicatively connected to the initiator. The storage system may further comprise a diagnostic module communicatively coupled with the initiator, the diagnostic module configured for: sending a predetermined pattern to the at least one target device; receiving a return result from each of the at least one target device in response to the predetermined pattern; recognizing a problem associated with a particular device of the at least one target device, the problem being recognized based on the return result from the particular device; sending a plurality of test patterns to the particular device; receiving a plurality of test results from the particular device in response to the plurality of test patterns; and determining a cause of the problem based on the plurality of test results, the cause of the problem being at least one of: a cable failure and a device failure.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

The present disclosure is directed to a system and method for detecting a failure in a serial topology (e.g., a SAS topology, a SATA topology or the like). When a failure is detected, the method of the present disclosure is further configured to narrow down the test to determine whether it is a cable failure or a device/drive failure. The host (initiator) of the topology may be informed once the determination is made, and possible remedies may be applied accordingly. The method of the present disclosure may be protocol agnostic, allowing the method to be utilized in various serial topologies including, but not limited to, SAS topologies, SATA topologies or the like. The method of the present disclosure may be invoked systematically based on a preconfigured condition (e.g., as a part of the initialization process at the start of day). Additionally/alternatively, the method of the present disclosure may be invoked on demand as a standalone application.

Figure 1:
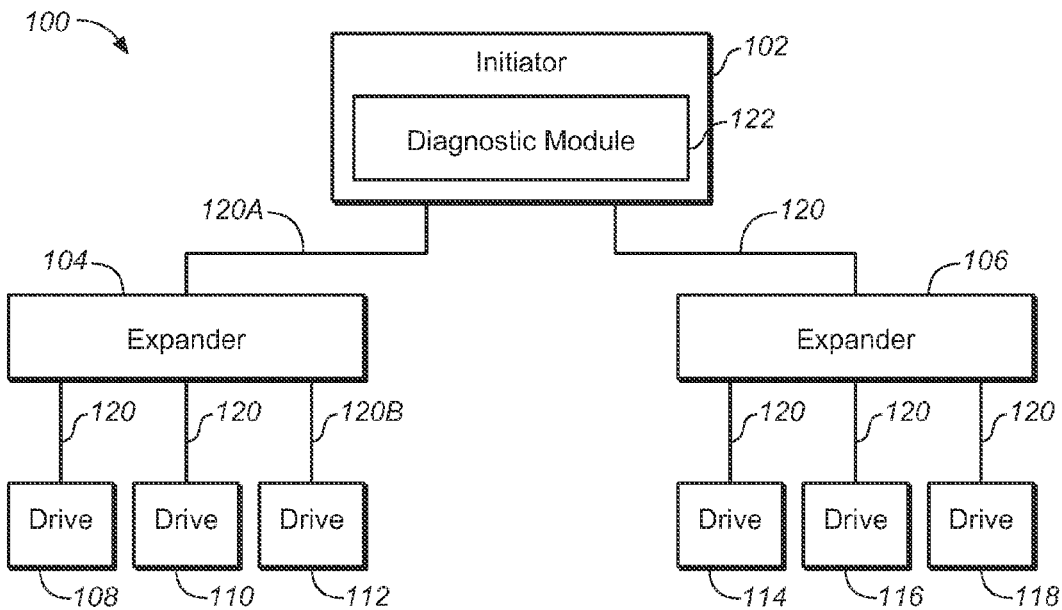
FIG. 1 is a block diagram illustrating a serially connected storage system.

Referring to FIG. 1, a block diagram depicting an exemplary serial topology 100 is shown. This exemplary serial topology may include an initiator 102 communicatively connected with a first expander 104 and a second expander 106 via data cables 120. Furthermore, the first expander 104 may be communicatively connected with a first drive 108, a second drive 110 and a third drive 112 via data cables 120. Similarly, the second expander 106 may be communicatively couple with a fourth drive 114, a fifth drive 116 and a sixth drive 118 via data cables 120.

The initiator 102 may include a diagnostic module 122 configured for detecting if any cable or drive in the topology 100 has gone bad. The diagnostic module 122 may be configured as an independent module communicatively coupled with the initiator 102. Alternatively, the diagnostic module 122 may be configured as an integrated/embedded component of the initiator 102 (e.g., as a part of the initiator firmware). The diagnostic module 122 may send a known pattern to every device in the topology 100 and analyze the return result from each device. In this manner, if the return result from a particular device is different from an expected return result in response to the known pattern, the diagnostic module 122 may recognize that there is an error associated with this particular device.

The known pattern may be any predetermined patterns that are suitable for detecting electromagnetic interference (EMI) related problems. Such patterns may include, but are not limited to, for example, a series of all ones (e.g., 1111 . . . ), a series of all zeros (e.g., 0000 . . . ), a series of alternating ones and zeros (e.g., 1010 . . . ) or the like. In one embodiment, the predetermined patterns and the return results may be transmitted as a part of the cyclic redundancy check (CRC) field of a data packet. However, the predetermined patterns and the return results may be transmitted in other fields, such as the payload field, without departing from the spirit and scope of the present disclosure.

If the return result from a particular device is different from an expected value, the diagnostic module 122 may recognize that there is a problem/error associated with this particular device. The diagnostic module 122 may then narrow down the test to determine whether the problem is caused by a cable failure or a device/drive failure. For example, if the return result received from the third drive 112 is different from the expected return result while other drives all returned as expected, the diagnostic module 122 may recognize that there is an error associated with the third drive 112. A possible cause of this error may be a failed cable connecting the initiator 102 and the third drive 112 (i.e., cable 120A or 120B may have failed). Another possible cause may be that the third drive 112 itself has failed.

The diagnostic module 122 may have logic rules defined to narrow down the list of possibly failed cables. In the example above, cable 120A connecting the initiator 102 and the expander 104 may be excluded from the list of possibly failed cables because drives 108 and 110 both returned as expected in response to the known pattern. Therefore, the cause of the error may be due to a possible cable failure occurred on cable 120B or a possible device failure occurred on the third drive 112.

The diagnostic module 122 may determine the cause of the error by sending multiple test patterns to the third drive 112 and analyze the test results returned from the third drive 112 in response to the plurality of test patterns. The test patterns and the test results may be transmitted as a part of data packets (e.g., as a part of the CRC or payload field). The test patterns may be any patterns that are suitable for producing electrical activities in the system. For example, the test patterns may include a first pattern having a series of zeros followed by a second pattern having a series of ones and followed by a third pattern again having a series of zeros (e.g., 0000 . . . , 1111 . . . , 0000 . . . ). Such test patterns may toggle all lines in a cable. Similar test patterns such as (AMA . . . , 5555 . . . , MM . . . ) may also be utilized. It is understood that the sample test patterns above is merely exemplary; the test patterns are not limited to just three series, and that various other patterns may be utilized without departing from the spirit and scope of the present disclosure.

Generally, if the error is caused by a cable failure (e.g., the cable may have some EMI related problems), the test results (in response to the multiple test patterns) may tend to produce certain physical layer errors such as disparity errors, CRC errors, end to end data protection (EEDP) errors, underrun errors, or the like. Therefore, the diagnostic module 122 may identify the type of the failure based on whether more than one of the test results have physical layer errors. If more than one of the test results have physical layer errors (e.g., disparity errors occurred multiple times), then the diagnostic module 122 may report the failure as a cable failure. Otherwise, the diagnostic module 122 may report the failure as a device failure.

Once the cause of the error is determined, this information may be provided to the initiator 102 and appropriate actions may be taken accordingly. For example, if the error is determined to be a device failure, the initiator may perform a failover operation (if available) to switch over from the failed device to another standby device. Otherwise, if the failover operation is unavailable, the initiator 102 may remove/disconnect the failed device from the topology 100 (e.g., stop all communications to and from this failed device) and notify/alert an operator. It is understood that the alert may be in the forms of a visual alert, an audible alert, a text alert or the like. If the error is determined to be a cable failure, the initiator may identify all the devices that are connected to this failed cable, and stop all communications (input/output requests) to and from these devices. Similarly, an operator may be notified about the cable failure, and the notification may be in the forms of a visual alert, an audible alert, a text alert or the like.

In one embodiment, the initiator 102 may include a register for keeping track of the number of physical layer errors occurring in the storage system. When an external error happens on the Phy of the particular device being tested, one of the register bits may be set accordingly. For example, one of these error bits is the disparity bit. Disparity, in terms of SAS, keeps a running account of what the parity should be on the data that are transmitted over the wire/cable. When the parity is not correct (a bit is in the wrong position from what was transmitted), a disparity error is signaled. In addition to the disparity register bit, a counter may be provided for counting the number of times the disparity error occurred on the wire. This counter may also be utilized to help determining whether the error was a single occurrence or if it happened multiple times. If the error only happened once, the error may be cleared and the data packet may be retransmitted assuming it will go through. If the error happens multiple times (with different transmission patterns), it may suggest that the cable might be bad and alert the end user with the location of the bad cable. It is understood that the register may also include a CRC error bit, an EEDP error bit, an underrun error bit or the like. Such error bits may be utilized in a similar manner as the disparity bit described above.

Alternatively, instead of relying on the registers of the initiator, the diagnostic module 122 may analyze each test result returned from the particular device being tested to determine whether the test result has a physical layer error. The diagnostic module 122 may keep a count of test results having such errors. If such physical layer errors occurred in the majority (e.g., more than 50%) of the test results, it may suggest that the cable might be bad and alert the end user with the location of the bad cable. Otherwise, the device being tested might be bad.

Figure 2:
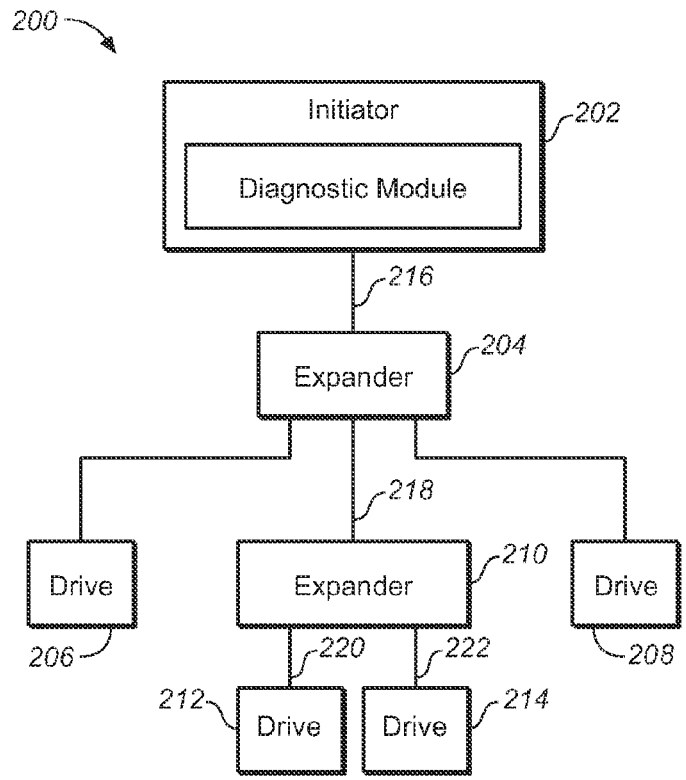
FIG. 2 is a block diagram illustrating another serially connected storage system.

It is understood that the topology illustrated in FIG. 1 is merely exemplary. Referring to FIG. 2, a block diagram depicting another serial topology 200 is shown. Topology 200 may include an initiator 202 communicatively connected with a first expander 204. The first expander 204 may be communicatively connected with a first drive 206, a second drive 208 and a second expander 210. Furthermore, the second expander 210 may be communicatively couple with a third drive 212 and a fourth drive 214. It is understood that there may be any number of expanders between an initiator and a target device.

A known pattern may be sent to each of the four drives. For illustrative purposes, suppose the return from drive 212 is not as expected, the diagnostic module may narrow down the test to determine whether the error is caused by a cable failure or a device/drive failure. The diagnostic module may have logic rules defined to narrow down the list of possibly failed cables as previously described. In this example, cable 216 connecting the initiator 202 and the expander 204 and cable 218 connecting the expander 204 and expander 210 may be excluded from the list of possibly failed cables (because other drives returned as expected in response to the known pattern). Therefore, the cause of the error may be due to a possible cable failure occurred on cable 220 connecting the expander 210 and the drive 212, or a possible device failure occurred on the drive 212. The diagnostic module may determine the cause of the error by sending multiple test patterns to drive 212 and analyze the test results returned from drive 212 in response to the plurality of test patterns. The cause of the error may be determined utilizing the same method as described above.

In another example, for illustrative purposes, suppose the returns from both drive 212 and drive 214 are not as expected, then drive 212 and drive 214 may have possibly failed, or one or more of cable 218, cable 220 and cable 222 may have possibly failed. The diagnostic module may determine the cause of the error by sending multiple test patterns to drives 212 and 214, and analyze the test results returned from each of the drives 212 and 214. If no disparity error has occurred in the return results from drive 212 and drive 214, the error may be identified as device failures on drive 212 and drive 214. If disparity errors occurred multiple times in the return results from drive 212 but not in the return results from drive 214, the error associated with drive 212 may be identified as a cable failure on cable 220 and the error associated with drive 214 may be identified as a device failure. If disparity errors occurred multiple times in the return results from both drive 212 and drive 214, the error may be identified as possible cable failures on any of the cables 218, 220 and 222. Additional statistical information may be utilized to further suggest that a cable failure on cable 218 may be more likely than a simultaneous failure of both cable 220 and cable 222. Such diagnostic results may be presented to an operator to address these possible failures.

Figure 3:
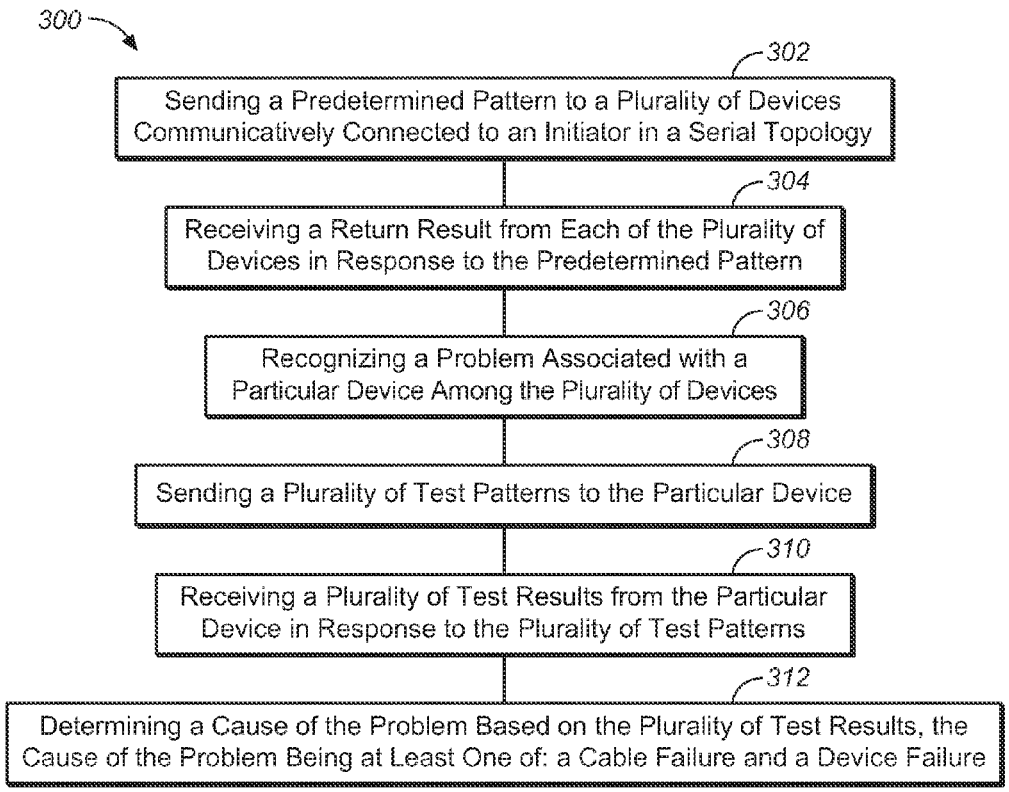
FIG. 3 is a flow diagram illustrating a method for error detection in accordance with the present disclosure.

FIG. 3 shows a flow diagram illustrating steps performed by an error detection method 300 in accordance with the present disclosure. The error detection method 300 may include a discovery phase for detecting possible errors and a determination phase for determining the cause of the errors. In one embodiment, the discovery phase may include step 302 for sending a predetermined pattern to a plurality of devices communicatively connected to an initiator in a serial topology, and step 304 for receiving a return result from each of the plurality of devices in response to the predetermined pattern. Based on the return results received from the devices, step 306 may recognize a problem associated with a particular device.

The determination phase may be utilized to determine the cause of the problem discovery in step 306. In one embodiment, the determination phase may include step 308 for sending a plurality of test patterns to the particular device and step 310 for receiving a plurality of test results from the particular device in response to the plurality of test patterns. Step 312 may then determine the cause of the problem based on the test results received. The cause of the problem, whether it is a cable failure or a device failure, may be determined based on occurrences of physical layer errors in the test results as previously described.

Figure 4:
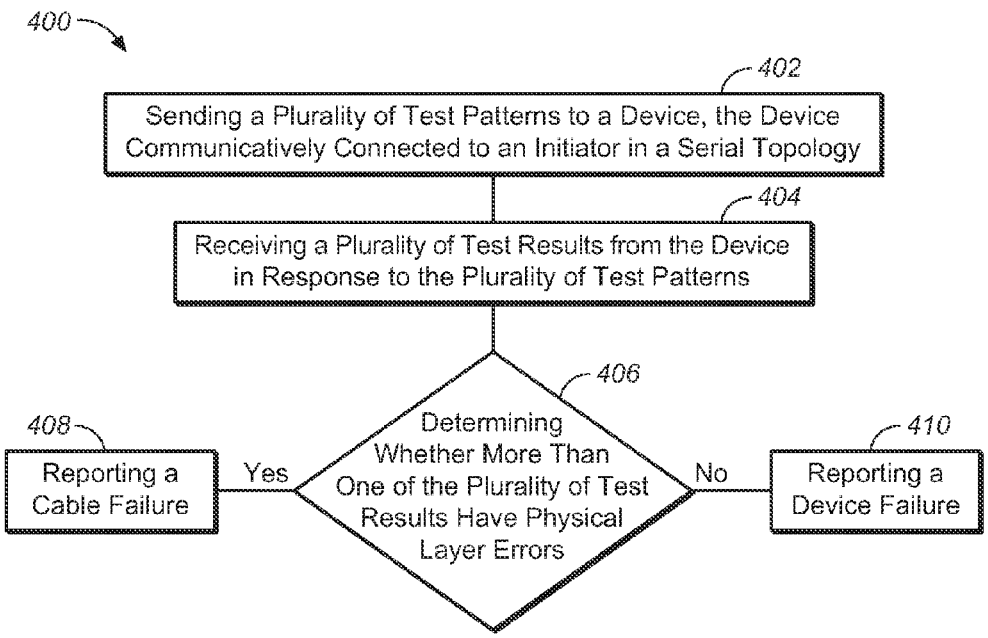
FIG. 4 is a flow diagram illustrating another method for error detection in accordance with the present disclosure.

FIG. 4 shows a flow diagram illustrating steps performed by an error detection method 400 in accordance with the present disclosure. Step 402 may send a plurality of test patterns to a device. Step 404 may receive a plurality of test results from the device in response to the plurality of test patterns. Step 406 may determine whether more than one of the plurality of test results have physical layer errors. In one embodiment, the number of test results having physical layer errors may be determined based on information provided by the error registers of the initiator. Alternatively, the number of test results having physical layer errors may be determined by analyzing each test result and keeping track of the number of test results having physical layer errors. If more than one of the plurality of test results have physical layer errors, then a cable failure is reported in step 408. Otherwise, a device failure is reported in step 410.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for error detection, comprising:
sending a predetermined pattern to a plurality of devices communicatively connected to an initiator in a serial topology;
receiving a return result from each of the plurality of devices in response to the predetermined pattern;
recognizing a problem associated with a particular device among the plurality of devices, the problem being recognized based on the return result from the particular device;
sending a plurality of test patterns to the particular device;
receiving a plurality of test results from the particular device in response to the plurality of test patterns; and
determining a cause of the problem based on the plurality of test results, the cause of the problem being at least one of: a cable failure and a device failure.

2. The method of claim 1, wherein determining a cause of the problem based on the plurality of test results further comprises:
determining whether more than one of the plurality of test results have physical layer errors;

identifying the cause of the problem as a cable failure when more than one of the plurality of test results have physical layer errors; and
identifying the cause of them problem as a device failure when not more than one of the plurality of test results have physical layer errors.

3. The method of claim 2, wherein the initiator comprises a register configured for keeping a count of physical layer errors occurred in the plurality of test results received from the particular device.

4. The method of claim 3, wherein determining whether more than one of the plurality of test results have physical layer errors further comprises:
retrieving the count of physical layer errors from the register; and
determining whether more than one of the plurality of test results have physical layer errors based on the count retrieved.

5. The method of claim 2, wherein determining whether more than one of the plurality of test results have physical layer errors further comprises:
analyzing each test result of the plurality of test results to determine whether the test result being analyzed has a physical layer error;
counting a number of test results having physical layer errors; and
determining whether more than one of the plurality of test results have physical layer errors based on the number of test results having physical layer errors.

6. The method of claim 2, wherein the physical layer error comprises at least one of: a disparity error, a cyclic redundancy check error, an end to end data protection error, and an underrun error.

7. The method of claim 1, wherein the serial topology comprises at least one of: a SAS topology and a SATA topology.

8. A method for error detection, comprising:
sending a plurality of test patterns to a device, the device communicatively connected to an initiator in a serial topology;
receiving a plurality of test results from the device in response to the plurality of test patterns;
determining whether more than one of the plurality of test results have physical layer errors;
reporting a cable failure when more than one of the plurality of test results have physical layer errors; and
reporting a device failure when not more than one of the plurality of test results have physical layer errors.

9. The method of claim 8, wherein the initiator comprises a register configured for keeping a count of physical layer errors occurred in the plurality of test results received from the device.

10. The method of claim 9, wherein determining whether more than one of the plurality of test results have physical layer errors further comprises:
retrieving the count of physical layer errors from the register; and
determining whether more than one of the plurality of test results have physical layer errors based on the number retrieved.

11. The method of claim 8, wherein determining whether more than one of the plurality of test results have physical layer errors further comprises:
analyzing each test result of the plurality of test results to determine whether the test result being analyzed has a physical layer error;
counting a number of test results having physical layer errors; and
determining whether more than one of the plurality of test results have physical layer errors based on the number of test results having physical layer errors.

12. The method of claim 8, wherein the physical layer error comprises at least one of: a disparity error, a cyclic redundancy check error, an end to end data protection error, and an underrun error.

13. The method of claim 8, wherein the serial topology comprises at least one of: a SAS topology and a SATA topology.

14. A storage system, comprising:
an initiator;
a plurality of target devices communicatively connected to the initiator; and
a diagnostic module communicatively coupled with the initiator, the diagnostic module configured for:
sending a predetermined pattern to the plurality of target devices;
receiving a return result from each of the plurality of target devices in response to the predetermined pattern;
recognizing a problem associated with a particular device of the plurality of target devices, the problem being recognized based on the return result from the particular device;
sending a plurality of test patterns to the particular device;
receiving a plurality of test results from the particular device in response to the plurality of test patterns; and
determining a cause of the problem based on the plurality of test results, the cause of the problem being at least one of: a cable failure and a device failure.

15. The storage system of claim 14, wherein determining a cause of the problem based on the plurality of test results further comprises:
determining whether more than one of the plurality of test results have physical layer errors;
identifying the cause of the problem as a cable failure when more than one of the plurality of test results have physical layer errors; and
identifying the cause of them problem as a device failure when not more than one of the plurality of test results have physical layer errors.

16. The storage system of claim 15, further comprising:
at least one register accessible to the diagnostic module, the at least one register configured for keeping a count of physical layer errors occurred in the plurality of test results received from the particular device.

17. The storage system of claim 16, wherein determining whether more than one of the plurality of test results have physical layer errors further comprises:
retrieving the count of physical layer errors from the at least one register; and
determining whether more than one of the plurality of test results have physical layer errors based on the count retrieved.

18. The storage system of claim 15, wherein determining whether more than one of the plurality of test results have physical layer errors further comprises:
analyzing each test result of the plurality of test results to determine whether the test result being analyzed has a physical layer error;
counting a number of test results having physical layer errors; and determining whether more than one of the plurality of test results have physical layer errors based on the number of test results having physical layer errors.

19. The storage system of claim 14, wherein the diagnostic module is at least one of: an embedded component of the initiator, and a separate component communicatively coupled with the initiator.

20. The storage system of claim 14, wherein the diagnostic module is at least one of: invoked systematically based on a preconfigured condition, and invoked on demand.

* * * * *